Feb. 1, 1966    A. G. BLOMQUIST ET AL    3,233,064
MINIATURE SOLENOID VALVE ACTUATOR
Filed April 28, 1961    6 Sheets-Sheet 1

INVENTORS
ARTHUR G. BLOMQUIST
LUDOLF LARSEN
MILTON C. NEUMAN
PALMER G. WERMAGER
BY Walter G. Finch
ATTORNEY Feb. 1, 1966 A. G. BLOMQUIST ET AL 3,233,064
MINIATURE SOLENOID VALVE ACTUATOR
Filed April 28, 1961 6 Sheets-Sheet 2

INVENTORS
ARTHUR G. BLOMQUIST
LUDOLPH LARSEN
MILTON C. NEUMAN
PALMER G. WERMAGER
BY Walter G. Finch
ATTORNEY INVENTORS
ARTHUR G. BLOMQUIST
LUDOLPH LARSEN
MILTON C. NEUMAN
PALMER G. WERMAGER
BY Walter J. Finch ATTORNEY Feb. 1, 1966    A. G. BLOMQUIST ET AL    3,233,064
MINIATURE SOLENOID VALVE ACTUATOR
Filed April 28, 1961    6 Sheets-Sheet 4

INVENTORS
ARTHUR G. BLOMQUIST
LUDOLPH LARSEN
MILTON C. NEUMAN
PALMER G. WERMAGER
BY Walter G. Finch
ATTORNEY INVENTORS
ARTHUR G. BLOMQUIST
LUDOLPH LARSEN
MILTON C. NEUMAN
PALMER G. WERMAGER
BY Walter G. Finch
ATTORNEY Feb. 1, 1966   A. G. BLOMQUIST ET AL   3,233,064
MINIATURE SOLENOID VALVE ACTUATOR
Filed April 28, 1961   6 Sheets-Sheet 6

INVENTORS
ARTHUR G. BLOMQUIST
LUDOLPH LARSEN
MILTON C. NEUMAN
PALMER G. WERMAGER
BY Walter G. Finch
ATTORNEY

United States Patent Office 3,233,064
Patented Feb. 1, 1966

3,233,064
MINIATURE SOLENOID VALVE ACTUATOR
Arthur G. Blomquist and Ludolph Larsen, Minneapolis, Milton C. Neuman, Champlin, and Palmer G. Wermager, Minneapolis, Minn., assignors, by mesne assignments, to FMC Corporation, San Jose, Calif., a corporation of Delaware
Filed Apr. 28, 1961, Ser. No. 106,334
13 Claims. (Cl. 200—98)

This invention relates generally to control devices, and more particularly it pertains to a miniaturized solenoid operated valve actuator.

It often happens that the positioning of controls for functioning of machinery is most conveniently accomplished by electric devices. One of these devices includes a core and coil solenoid for performing a short pulling or pushing action. Where both functions are involved and a return spring is inadequate, two solenoids are used in alternation. To hold the commanded position, should power be interrupted or for other reasons, an electrically releasable latch is necessary.

It is a principal object of this invention to provide a compact, efficient, universally useful solenoid valve actuator which combines the features of three position electric control with latching and which can be manually positioned, overriding the solenoid latch if necessary.

Another object of this invention is to provide a miniaturized solenoid valve actuator which is economical to manufacture, which is reliable and efficient in operational use, and which is easy to install and maintain.

Other objects and attendant advantages of this invention will become more readily apparent and understood from the following detailed specification and accompanying drawings in which.

Figure 3:
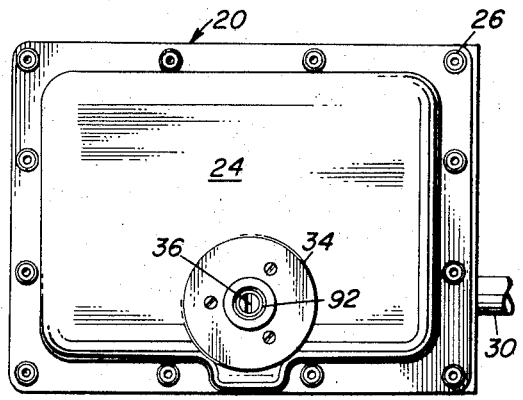
FIG. 3 is a front elevation of the solenoid valve actuator shown in FIG. 1.
Figure 4:
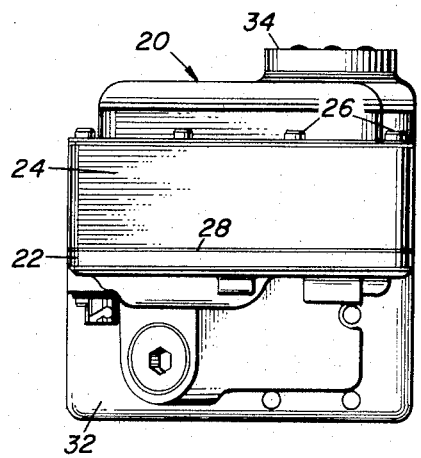
FIG. 4 is a top view of the solenoid valve actuator of FIG. 1.
Figure 1:
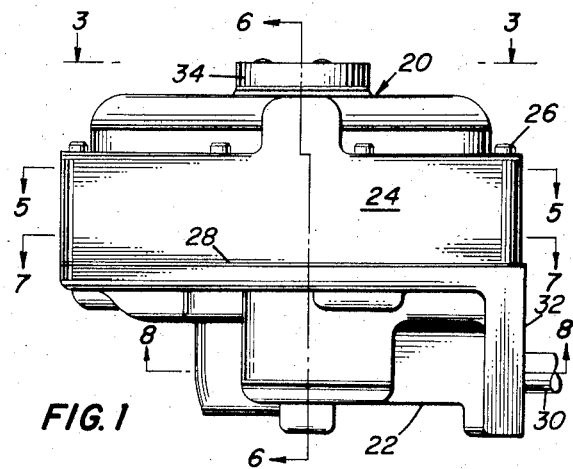
FIG. 1 is a left side elevation of a solenoid valve actuator incorporating features of this invention.
Figure 2:
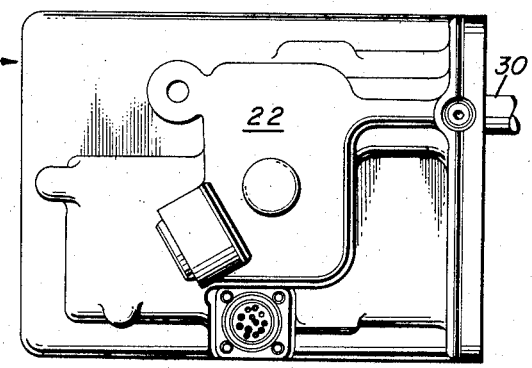
FIG. 2 is a rear elevation of the solenoid valve actuator of FIG. 1.

Referring now to the details of the drawings, the housing of the miniature solenoid valve actuator 20 of this invention consists of a two-piece metal casting having a flanged base 22 and a cover 24 as shown best in FIGS. 1, 2, 3, and 4. Peripherially located bolts 26 and an intervening gasket 28 are used to secure the base 22 and cover 24 together to form a hermetically tight enclosure or housing. A plunger rod 30 extends through a machined surface flange 32 for the purpose of operating an external valve or the like to the valve block of which the flange 32 may be bolted.

Figure 9:
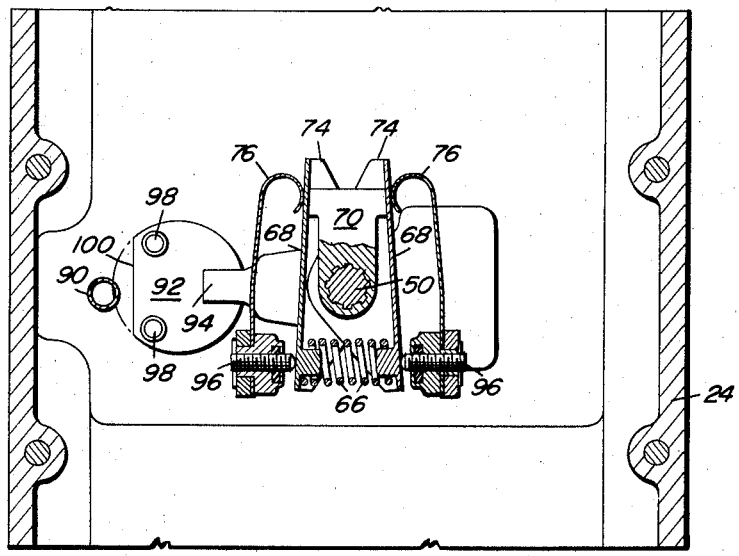
FIG. 9 is a cross section of a manual release mechanism viewed from below along the line 9—9 of FIG. 6.
Figure 10:
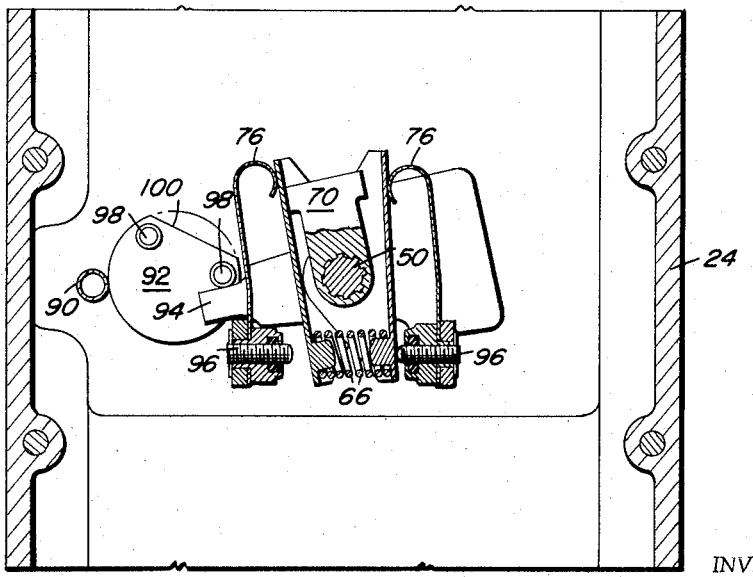
FIG. 10 is a drawing similar to that of FIG. 9 showing the operation of the manual release mechanism.

The top of the cover 24 for the housing of the solenoid valve actuator 20 is formed with a boss 34 which mounts a stroking shaft 92, best illustrated in FIGS. 3, 9, and 10, having a socket 36 for a manual operating key, not shown.

Figure 6:
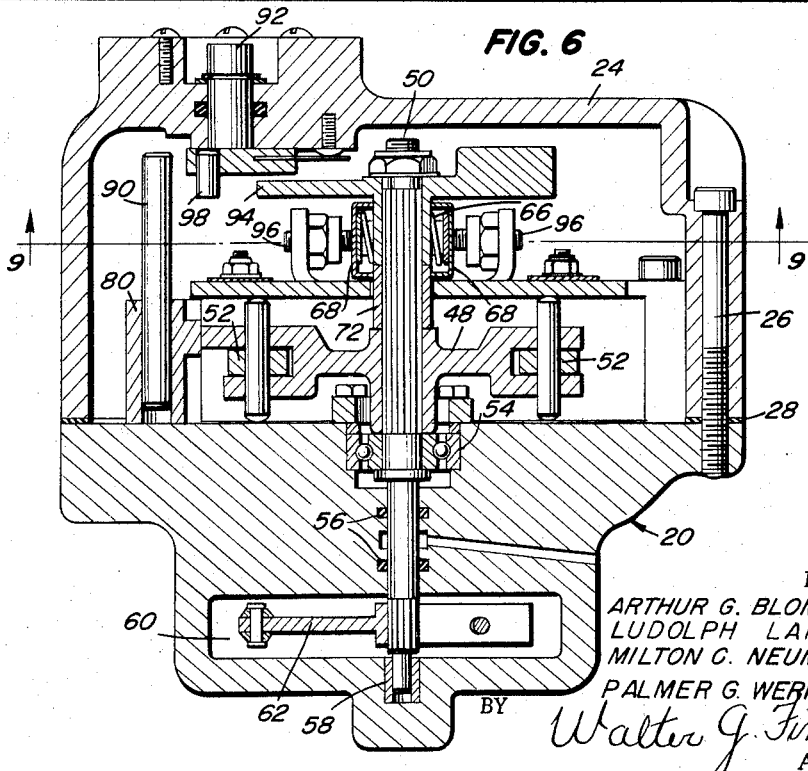
FIG. 6 is a horizontal cross section, much enlarged, taken along line 6—6 of FIG. 1.
Figure 7:
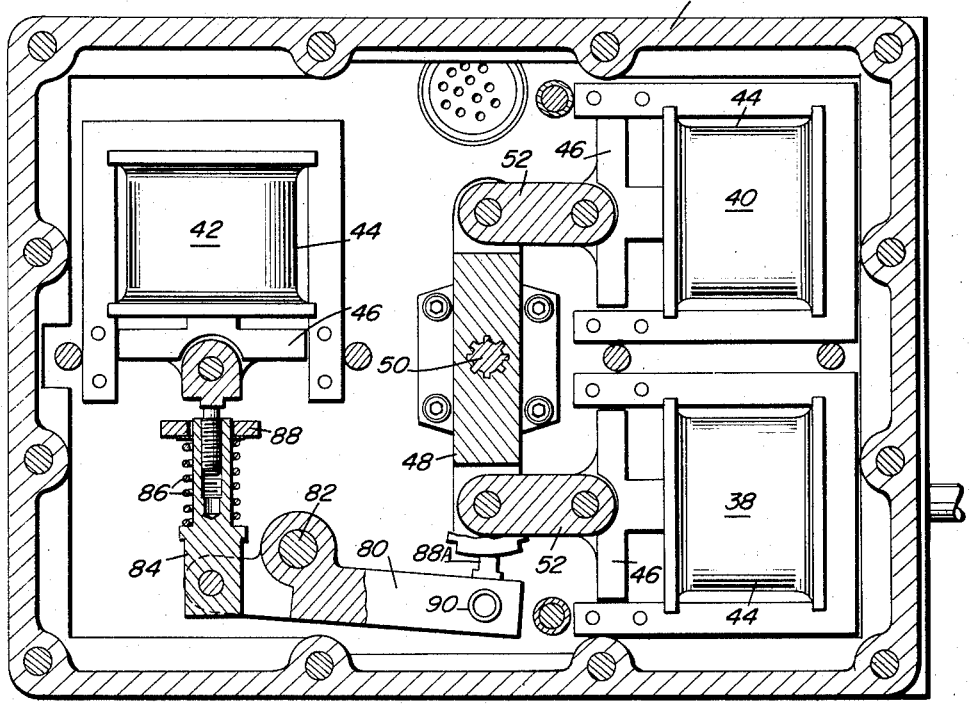
FIG. 7 is a vertical cross section similar to FIG. 5, much enlarged, but taken along line 7—7 of FIG. 1.

Within the cover 24 and secured on the base 22 there are provided three solenoids, an extend solenoid 38, a retract solenoid 40, and a latch release solenoid 42 as shown best in FIG. 7. These solenoids 38, 40, and 42 are of conventional type each having a stationary coil 44 and a movable armature 46. The armatures 46 of the extend and retract solenoids 38 and 40, respectively, are attached to the opposite ends of a latch arm 48 by means of pivotally mounted links 52, as shown best in FIGS. 5, 6 and 7. The latch arm 48 is spline-fitted at its center to a vertical actuator shaft 50.

The actuator shaft 50 extends both upwardly and downwardly from its engagement with the latch arm 48 as shown best in FIG. 6. In the downward direction, this actuator shaft 50 passes through a bearing 54, a pair of spaced O-rings 56 and it terminates in a bearing bushing 58 in the bottom of a chamber 60.

Figure 8:
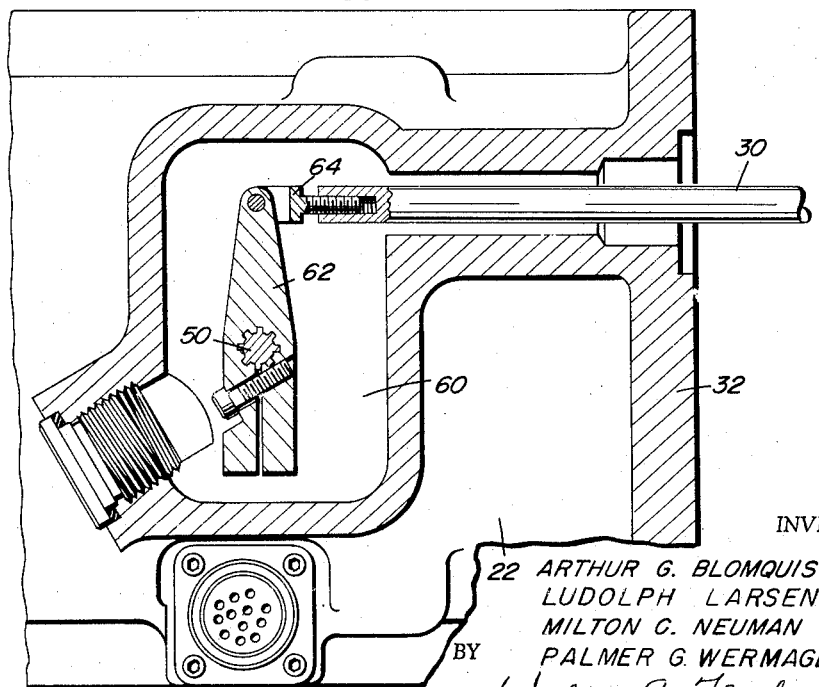
FIG. 8 is a vertical cross section, partly broken away and much enlarged, taken along line 8—8 of FIG. 1.

As best shown in FIG. 8, this chamber 60 houses a valve lever 62 which is splined and clamped to the actuator shaft 50. The end of lever 62 is attached to the end of the previously mentioned plunger rod 30 by means of a clevis 64. Thus, when extend solenoid 38 pulls in, the plunger rod 30 extends. Conversely, when the retract solenoid 40 pulls in, the rod 30 retracts.

Figure 5:
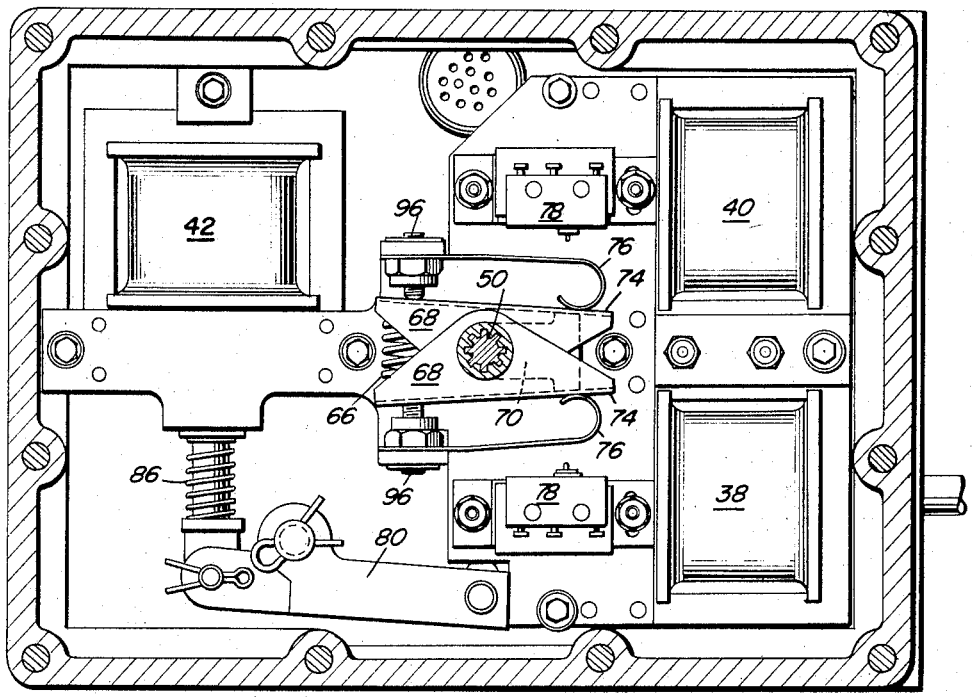
FIG. 5 is a vertical cross section, much enlarged, taken along the line 5—5 of FIG. 1.

The middle or neutral point of this operation is established by a compression coiled neutral spring 66 located in the upper part of the cover 24 as shown in FIGS. 5 and 6. A pair of switch actuators 68, pivotally held in overlapping relationship upon a spacer 72, embrace the neutral spring 66 between them much in the fashion of a clothespin. Each switch actuator 68 is arranged so that it can rotate freely within predetermined limits about the actuator shaft 50.

An actuator bar 70 which is keyed to the actuator shaft 50, as shown best in FIGS. 5, 9, and 10, is located between the jaws 74 of the two switch actuators 68. By means of the neutral spring 66 and a pair of adjusting screws 96, the actuator bar 70 is restrained in a set position between the switch actuators 68. This set position represents the mid-stroke of the linked-together extend and retract solenoids 38 and 40, respectively.

A sheet metal actuator spring 76 is mounted against the side of each switch actuator 68 and is positioned so as to actuate an adjacent subminiature switch 78 on deflection.

As best illustrated in FIG. 7, a latch 80 is mounted on a fixed pivot pin 82. The latch 80 is pinned at one end to a piston-like link 84. Upon this link 84, there is provided a compression coiled spring 86 which bears against a fixed bracket 88 and urges the latch 80 to rotate counterclockwise as viewed in FIG. 7.

The other end of latch 80 is provided with a long vertical latch release pin 90 and a finger-like horizontal catch 88A. This catch 88A, under urging of spring 86, bears against the end of the latch arm 48 or latches with one side or the other thereof depending on which way the shaft 50 is turned.

To release the catch 88A from engagement with the latch arm side, it is necessary to rotate the latch 80 a small amount in a clockwise direction. This is accomplished through the latch release solenoid 42 whose armature 46 is adjustably attached to the link 84.

Manual operation of the shaft 50 may also be achieved whether the extend or retract solenoids 38 and 40, respectively, have been energized and latched or not. A manual release arm 94, best shown in FIGS. 6 and 9 is secured to the top end of the actuator shaft 50. With the solenoids 38 and 40 in neutral, that is, the unlatched position, by rotating the stroking shaft 92 in either direction with a removable external key as previously mentioned, one of a pair of pins 98 at the bottom of the shaft 92 will engage the end of the manual release arm 94.

This, through the actuator shaft 50, will rotate the latch arm 48 and the links 48 and 52 which are attached to the solenoids 38 and 40. At the same time, the plunger rod 30 is extended (or retracted) as desired. By returning the stroking shaft 92 to its original position, the "clothespin" mechanism consisting of the neutral spring 66, the switch actuators 68 and the actuator bar 70 will return the solenoids 38 and 40 and the plunger rod 30 to a neutral position.

With either solenoid 38 or 40 previously energized so that the latch 80 is engaged, the first portion of rotation of the stroking shaft 92 will cause a cam surface 100 machined thereon to contact the long latch release pin 90 on the latch 80 causing the latter to move and unlatch as shown best in FIG. 10. Upon unlatching, solenoids 38 and 40 will once again center and further rotation of the stroking shaft 92 will bring one or the other pin 98 in contact with the release arm 94 which, through the agency of shaft 50, causes either an extend or retract motion of the plunger rod 30 depending on which way the key is turned.

Figure 11:
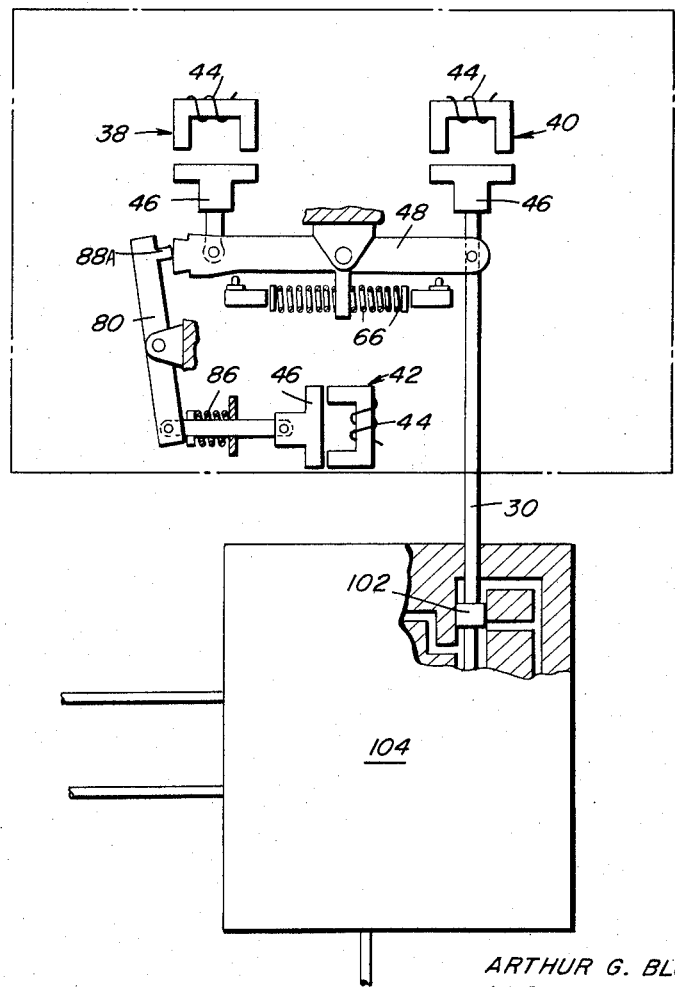
FIG. 11 is a schematic diagram of the components of the solenoid valve actuator illustrating the principles of operation thereof in conjunction with a typical valve.
Figure 12:
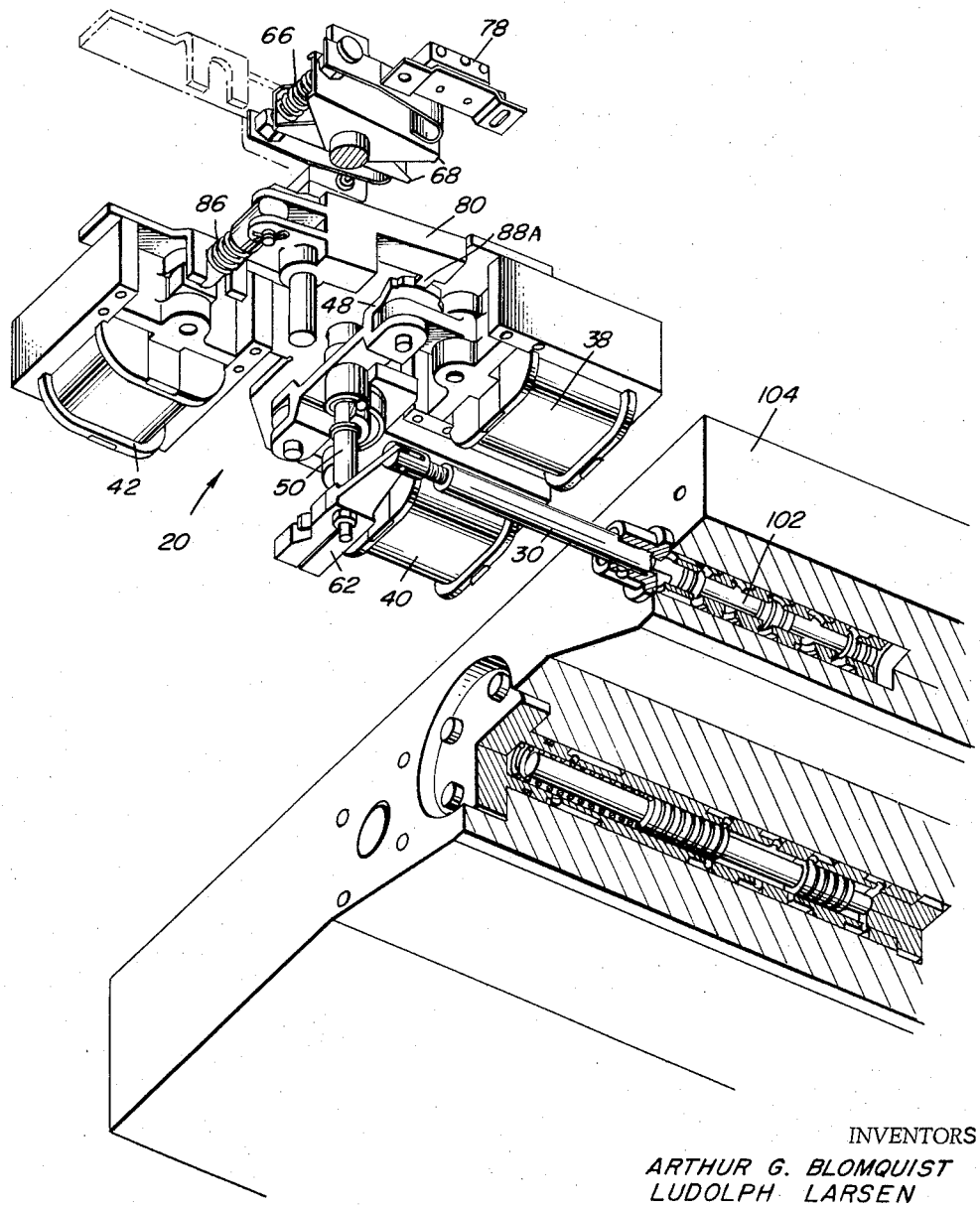
FIG. 12 is a perspective view of the components of the solenoid valve actuator, case removed, and illustrating an application to a typical valve.

FIGS. 11 and 12 illustrate schematically and pictorially, respectively, the application of the novel miniature solenoid valve actuator 20 to a typical selector valve 102 in a conventional valve block 104.

It is to be noted that the miniature solenoid valve actuator as described in the paragraphs above when properly mounted by its flange 32 to an associated valve block provides complete water tighteners. Further, because of the balanced configuration of the working elements, namely the centrally-pivoted latch 80, latch arm 48, valve lever 62 and manual release arm 94 high impact shock in any direction as encountered in ordnance machinery has no effect and cannot trip nor actuate it.

Obviously many modifications and variations of the present invention are possible in light of the above teachings. It is, therefore, to be understood that within the scope of the appended claims the invention may be practiced otherwise than as specifically described.

What is claimed is:

1. A device for moving a member, comprising, first and second actuating means, rotatably mounted arm means mechanically linked at its opposite ends to one end of each of said first and second actuating means and positioned intermediate said first and second actuating means, said rotatably mounted arm means having a camming surface at one of its ends, means coupled to said rotatably mounted arm means and said member for moving said member when one of said first and second actuating means is in an extended position and the other of said first and second actuating means is in a retracted position, means including a catch in camming engagement with said camming surface of said rotatably mounted arm means for maintaining the extremes of movement of said member within predetermined limits, means for releasing said last mentioned means including said catch to relinquish control of the movement of said member within said predetermined limits, and means for returning said rotatably mounted arm means to a neutral position.

2. A device for moving a member, comprising, first and second actuating means, rotatably mounted arm means mechanically linked at its opposite ends to one end of each of said first and second actuating means and positioned intermediate said first and second actuating means, said rotatably mounted arm means having a camming surface at one of its ends, means coupled to said rotatably mounted arm means and said member for moving said member when one of said first and second actuating means is in an extended position and the other of said first and second actuating means is in a retracted position, means including a catch in camming engagement with said camming surface of said rotatably mounted arm means for maintaining the extremes of movement of said member within predetermined limits, means for releasing said last mentioned means including said catch to relinquish control of the movement of said member within said predetermined limits, and means for biasing said rotatably mounted arm means in an intermediate position so as to move said member to a correspondingly intermediate position between the predetermined limits of movement of said member.

3. A device for moving a member as recited in claim 2, and additionally means for releasing said biasing means.

4. A device for moving a member as recited in claim 2, and additionally means for manually overcoming said biasing means to move said rotatably mounted arm means to said predetermined limits.

5. A signalling device, comprising, first and second actuating means, rotatably mounted arm means mechanically linked at its opposite ends to one end of each of said first and second actuating means and positioned intermediate said first and second actuating means, said rotatably mounted arm means having a camming surface at one of its ends, means coupled to said rotatably mounted arm means and said member for moving said member when one of said first and second actuating means is in an extended position and the other of said first and second actuating means is in a retracted position, means including a catch in camming engagement with said camming surface of said rotatably mounted arm means for maintaining the extremes of movement of said member within predetermined limits, means for biasing said rotatably mounted arm means to an intermediate position so as to move said members to a corresponding intermediate position between said predetermined limits of said member, a switch means for each predetermined limit of movement of said rotatably mounted arm means, said switch means being operated independently by said biasing means when one of said first and second actuating means is in an extended position and the other of said first and second actuating means is in a retracted position, with said switch means being rendered inoperative when said rotatably mounted arm means is in said intermediate position.

6. A signalling device as recited in claim 5, and additionally means for releasing said means including a catch for relinquishing control of said rotatably mounted arm means.

7. A signalling device as recited in claim 5, and additionally means for manually overcoming said biasing means to move said rotatably mounted arm means to said predetermined limits.

8. A device for moving a member, comprising, first and second actuating means, linkage means mounted for rotation about an axis and mechanically linked at its opposite ends to one end of each of said first and second actuating means and positioned intermediate said first and second actuating means, said linkage means having a camming surface at one of its ends, means coupled to said linkage means and said member for moving said member when one of said first and second actuating means is in an extended position and the other of said first and second actuating means is in a retracted position, means including a catch in camming engagement with said camming surface of said linkage means for maintaining the extremes of movement thereof within predetermined limits, means for releasing said means including a catch to relinquish control of said member within said predetermined limits, and means for returning said linkage means to an intermediate position.

9. A device for moving a member, comprising, first, second, and third spaced actuating means, linkage means mounted for rotation about an axis and mechanically connected at its opposite ends to one end of each of said first and second actuating means and positioned intermediate said first and second actuating means, said linkage means having a camming surface at one of its ends, means coupled to said linkage means for moving said member when one of said first and second actuating means is in an extended position and the other of said first and second actuating means is in a retracted position, pivotally mounted means including a catch in camming engagement with said camming surface of said linkage means and said third actuating means for maintaining the extremes of movement of said linkage means within predetermined limits, means for releasing said means including a catch to relinquish control of said member within said predetermined limits, and means for returning said linkage means to a neutral position.

10. A solenoid operated device for positioning a member, comprising, a pair of spaced solenoids, linkage means mounted for rotation about an axis and mechanically connected at its opposite ends to one end of each of said pair of solenoids and positioned intermediate said pair of solenoids, means coupled to said linkage means and said member for moving said member when one of said pair of solenoids is in extended position and the other of said pair of solenoids is in a retracted position, said linkage means having a camming surface at one of its ends, solenoid operated pivotally mounted means including a catch in camming engagement with said camming surface of said linkage means for maintaining the extremes of rotational movement of said linkage means within predetermined limits so as to position said linkage means and thereby said member, means for releasing said solenoid operated pivotally mounted means including a catch to relinquish control of said member within said predetermined limits, and means for biasing said linkage means in an intermediate position so as to move said member to a correspondingly intermediate position between the predetermined limits of said member.

11. A solenoid operated device for moving a member as recited in claim 10, and additionally means for manually overcoming said biasing means to move said linkage means to said predetermined limits.

12. A solenoid operated device for moving a member, comprising, first, second, and third solenoids, linkage means mounted for rotation about an axis and pivotally connected at its opposite ends to one end of each of said first and second solenoid and positioned intermediate said first and second solenoids, said linkage means having a camming surface at one end, means coupled to said linkage means and said member for moving said member when one of said first and second solenoids is in an extended position and the other of said first and second solenoids is in a retracted position, pivotally mounted means including a catch in camming engagement with said camming surface of said linkage means and said third solenoid for maintaining extremes of movement of said member within predetermined limits, and means for releasing said pivotally mounted means including a catch to relinquish control of said member within said predetermined limits, and means for returning said linkage means to an intermediate position.

13. A device for moving a member, comprising, first and second actuating means, rotatably mounted means mechanically connected at its opposite ends to one end of each of said first and second actuating means and positioned intermediate said first and second actuating means, said rotatably mounted means having a camming surface at one end thereof, means coupled to said rotatably mounted means and said member for moving said member when one of said first and second actuating means is in an extended position and the other of said first and second actuating means is in a retracted position, means for biasing said rotatably mounted means in an intermediate position, means for manually overcoming said biasing means to thereby move said rotatably mounted means, automatic latching means in camming engagement with said camming surface of said rotatably mounted means for holding said rotatably mounted means in selected positions, and means for manually overcoming said automatic latching means so that said rotatably mounted means can be biased to an intermediate position, whereby movement of said member is optionally manually controllable regardless of whether said rotatably mounted means are in a biased intermediate position as well as in a latched position.

References Cited by the Examiner
UNITED STATES PATENTS

| 609,274 | 8/1898 | Gill | 200—98 |
| 852,690 | 5/1907 | Wright | 200—98 |
| 892,655 | 7/1908 | Duryee | 200—98 |
| 2,061,347 | 11/1936 | Coe | 200—98 |
| 2,414,472 | 1/1947 | Loughridge | 200—98 |
| 2,452,065 | 10/1948 | Moran et al. | 200—98 |
| 2,470,614 | 5/1949 | Geiselman et al. | 200—98 |
| 2,675,443 | 4/1954 | Wyckoff | 200—98 |

FOREIGN PATENTS 792,315  12/1935  France.

BERNARD A. GILHEANY, *Primary Examiner.*

MAX L. LEVY, *Examiner.*